(12) United States Patent
Itsuji et al.

(10) Patent No.: US 7,248,995 B2
(45) Date of Patent: Jul. 24, 2007

(54) SPATIAL POSITION DETECTION METHOD, INFORMATION INPUT METHOD, SPATIAL POSITION DETECTION APPARATUS, AND INFORMATION INPUT APPARATUS

(75) Inventors: Takeaki Itsuji, Hiratsuka (JP); Toshihiko Ouchi, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 10/539,268

(22) PCT Filed: Sep. 8, 2004

(86) PCT No.: PCT/JP2004/013394

§ 371 (c)(1),
(2), (4) Date: Jun. 16, 2005

(87) PCT Pub. No.: WO2005/026941

PCT Pub. Date: Mar. 24, 2005

(65) Prior Publication Data

US 2006/0085159 A1    Apr. 20, 2006

(30) Foreign Application Priority Data

Sep. 12, 2003  (JP)  ............................. 2003-322137

(51) Int. Cl.
*G06F 19/00* (2006.01)

(52) U.S. Cl. ........................................ 702/159; 367/38

(58) Field of Classification Search ................ 702/159, 702/160, 97, 125, 189, 191; 367/38, 59; 342/25, 179; 714/745, 746
See application file for complete search history.

(56) References Cited

U.S. PATENT DOCUMENTS

| 5,586,131 A | 12/1996 | Ono et al. ..................... 372/19 |
| 5,629,704 A | 5/1997 | Throngnumchai et al. .... 342/54 |
| 5,659,560 A | 8/1997 | Ouchi et al. .................. 372/27 |
| 5,699,373 A | 12/1997 | Uchida et al. ................ 372/27 |
| 5,764,670 A | 6/1998 | Ouchi .......................... 372/45 |
| 6,339,748 B1 | 1/2002 | Hiramatsu .................. 702/159 |
| 6,854,901 B1 | 2/2005 | Ouchi .......................... 385/89 |
| 7,062,116 B2 | 6/2006 | Ouchi .......................... 385/14 |
| 7,064,819 B2 * | 6/2006 | Detweiler et al. ........ 356/141.1 |

(Continued)

FOREIGN PATENT DOCUMENTS

JP            6-168065         6/1994

(Continued)

*Primary Examiner*—Edward Raymond
(74) *Attorney, Agent, or Firm*—Fitzpatrick, Cella, Harper & Scinto

(57) ABSTRACT

To calculate information on a relative distance or positional relationship between an interface section and an object by detecting an electromagnetic wave transmitted through the interface section, and using the electromagnetic wave from the object to detect a relative position of the object with respective to the interface section. Information on the relative spatial position of an object 101 with respect to an interface section 102 that has an arbitrary shape and deals with transmission of information or signal from one side to the other side of the interface section 102 is detected with a spatial position detection method. An electromagnetic wave 106 radiated from the object 101 and transmitted through the interface section 102 is detected by an electromagnetic wave detection section 103, and based on the detection result, information on spatial position coordinates of the object 101 is calculated by a position calculation section 104.

10 Claims, 8 Drawing Sheets

U.S. PATENT DOCUMENTS

| | | | |
|---|---|---|---|
| 2006/0039431 A1 | 2/2006 | Sekiguchi et al. | 372/44.01 |
| 2006/0085160 A1 | 4/2006 | Ouchi | 702/150 |
| 2006/0188398 A1 | 8/2006 | Yano et al. | 422/82.01 |
| 2006/0197021 A1 | 9/2006 | Ouchi | 250/343 |
| 2006/0214176 A1 | 9/2006 | Ouchi et al. | 257/98 |
| 2006/0227340 A1 | 10/2006 | Shioda et al. | 356/614 |
| 2006/0244629 A1 | 11/2006 | Miyazaki et al. | 340/855.7 |
| 2007/0030115 A1 | 2/2007 | Itsuji et al. | 340/5.8 |

FOREIGN PATENT DOCUMENTS

| | | |
|---|---|---|
| JP | 7-35842 | 2/1995 |
| JP | 8-82670 | 3/1996 |
| WO | 88/09513 | 12/1998 |

\* cited by examiner

SPATIAL POSITION DETECTION METHOD, INFORMATION INPUT METHOD, SPATIAL POSITION DETECTION APPARATUS, AND INFORMATION INPUT APPARATUS

TECHNICAL FIELD

The present invention relates to a spatial position detection method and apparatus for finding out information on a spatial position of an object radiating an electromagnetic wave by using an electromagnetic wave transmitted through an interface section, and an information input method and apparatus for, after detection of information on a positional relationship between the object and the interface section, processing the information in accordance with a predetermined interpretation method and controlling an operation of an apparatus and input states of information or a signal.

BACKGROUND ART

As a spatial position detection apparatus, there is exemplified a three-dimensional position detection apparatus which forms images based on infrared rays radiated from a human body by using plural infrared cameras and calculates center coordinates of the human body based on the detected images to detect a position of the human body (JP 07-035842 A). In addition, another spatial position detection apparatus is known in which a beam is emitted from a LED and based on an electromagnetic wave reflected by an object, an angle and intensity of a reflected light are calculated to thereby detect a position of the object (JP 08-082670 A).

Common information input apparatuses utilizing an electromagnetic wave include a touch panel and a pen input apparatus. For example, there is a pen input apparatus which calculates information on incident angles of lights emitted from a pen tip and entering light receiving elements (each of which is composed of a CCD and a lens) installed in two positions, based on irradiation position information of the lights incident on surfaces of CCDs, thus detecting a position of the pen tip (JP 06-168065 A).

In the above-mentioned spatial position detection apparatus utilizing infrared rays, a three-dimensional image of the object is constructed based on images taken by the plural infrared camera. However, if each of the infrared images formed using the infrared cameras does not include information on an angle to some extent, it is difficult to construct the three-dimensional image of the object. To allow each of the infrared images to include angle information, the necessity arises to arrange the infrared cameras spatially, which leads to a problem of making the apparatus structure large. In the apparatus for detecting the position of the object based on the light reflected by the angle and the intensity of the reflected light by using the LED as described above, a light source driver device needs to be provided separately, and therefore the apparatus also has a problem in that its structure becomes large.

In the aforementioned pen input apparatus, the lights are emitted from the pen tip to detect a position of the pen tip based on information on the incident angles of the lights entering the light receiving elements. However, for the pen input apparatus, it is at least necessary to secure a space for disposing the light receiving elements in front of the interface section. Moreover, in this case, since light has a rectilinear characteristic, there is a problem with flexibility in layout. For example, it is difficult to arrange the light receiving elements for detecting the object position in an interface section having irregularities or a curved surface.

DISCLOSURE OF THE INVENTION

In view of the above-mentioned problems, according to the present invention, there is provided a spatial position detection method for detecting information on a relative spatial position of an object with respect to an interface section having an arbitrary shape and dealing with transmission of information and a signal from one side to the other side of the interface section, the spatial position detection method including: detecting an electromagnetic wave radiated from the object and transmitted through the interface section; and calculating information on spatial position coordinates of the object based on a result of the detecting (the information may be position coordinate data at any given time or may be in a form of the position coordinate data changing over time).

In the spatial position detection method according to the present invention, more specific aspects can be attained as follows.

In a typical spatial position detection method, the electromagnetic wave is detected by calculating a position of a focus spot resulting from focus of the electromagnetic wave radiated from the object and transmitted through the interface section. Examples of means for the focus used herein include a transmissive lens and a reflective mirror having a curbed surface. Such an aspect may be adopted that the focus means is directly formed in an inner surface or the like of the interface section. Used as displacement detection means for detecting the electromagnetic wave radiated from the object are means composed of the plural electromagnetic wave detection elements, means composed of the plural electromagnetic wave detection elements and an antenna array, and the like. When the focus means is disposed as close to the displacement detection means as possible, such a convenience is achieved that the size of the focus means can be made small. A tip end portion of the object preferably has a heat source that radiates an electromagnetic wave.

In addition, such an aspect may be adopted that shape information of the interface section is stored as spatial coordinate data in advance, and relative spatial position information of the object with respect to the interface section is calculated based on the spatial position coordinates of the object and the stored spatial coordinate data of the interface section.

In addition, such an aspect may be adopted that when the electromagnetic wave radiated from the object is focused, a position in a focus spot having a highest signal intensity in an intensity distribution of the focus spot is set as the position of the focus spot, an incident angle of the electromagnetic wave radiated from the object and entering the interface section is calculated based on the position of the focus spot and optical characteristics exhibited during focusing of the electromagnetic wave, and information on spatial position coordinates of the object is calculated based on the intensity of the focus spot and the incident angle of the electromagnetic wave radiated from the object. In this case, at an initial stage of the use, the intensity of the focus spot in a known position of the object is measured, and correction may be performed on a relationship between the intensity of the focus spot and a propagation distance of the electromagnetic wave. Alternatively, such an aspect may be adopted that plural positions of focus spots on predetermined surfaces caused by respectively focusing the electromagnetic wave radiated from the object are calculated, positions in the respective focus spots having a highest signal intensity in the intensity distribution of the focus spot are each set as the position of the focus spot, plural incident angles of the electromagnetic wave radiated from the object and entering the interface section are calculated based on the plural positions of the focus spots and optical characteristics exhibited during the focus of the electromagnetic wave, and information on spatial position coordinates of the object is calculated based on the plural incident angles of the electromagnetic wave.

In addition, such an aspect may be adopted that information on a physical property distribution of the interface section is stored in advance, an influence exerted by the interface section to propagation characteristics of the electromagnetic wave in incident angle positions of the electromagnetic wave on the interface section is taken into a consideration, and correction is performed on the calculation of the information on the spatial position of the object. In this case, a physical property information memory section may also be configured to update the information on the physical property distribution of the interface section depending on an environment surrounding the interface section.

From the viewpoint of the directivity and transmission, the electromagnetic wave radiated from the object having a frequency bandwidth, which is arbitrarily selected with in a range from 30 GHz to 30 THz, is preferably used.

Further, in view of the above-mentioned problems, an information input method according to the present invention relates to an information input method that employs the spatial position detection method described above, including: monitoring information on a relative distance between an arbitrary position of the interface section and the object; processing a result of the monitoring in accordance with a predetermined interpretation method; and controlling an operation of an apparatus and input states of information and a signal.

Further, in view of the above-mentioned problems, a spatial position detection apparatus according to the present invention relates to a spatial position detection apparatus for implementing the above-mentioned spatial position detection method, at least including: at least one electromagnetic wave detection section for detecting an electromagnetic wave radiated from the object and transmitted through the interface section; and a position calculation section for calculating information on spatial position coordinates of the object based on a result of the detecting, in which the interface section has characteristics of transmitting the electromagnetic wave radiated from the object, and at least the electromagnetic wave detection section and the position calculation section are provided in a space on the opposite side of the object with the interface section regarded as a boundary or enclosed inside the interface section.

Further, in view of the above-mentioned problems, an information input apparatus according to the present invention relates to an information input apparatus, including: the above spatial position detection apparatus; and an information input/output control section that is provided in a space on the opposite side of the object with the interface section regarded as a boundary or enclosed inside the interface section, monitors information on a relative distance between an arbitrary position of the interface section and the object, processes a result of the monitoring in accordance with a predetermined interpretation method, and controls an operation of an apparatus and input states of information or a signal.

In the information input apparatus according to the present invention, more specific structures may be attained as follows. That is, such a structure may be adopted that the information input/output control section divides the interface section into several regions, associates information on a position of each region with an operation performed by the information input apparatus for each region, and manages each of the regions as a virtual control element having a predetermined function. For regions corresponding to devices constituting the information input apparatus, the operations of such devices may be controlled individually. Also, such a structure may be adopted that the object includes a part of a human body radiating the electromagnetic wave, the information input/output control section monitors a distance between the virtual control element and the object when the object approaches the virtual control element corresponding to a button or a switch; and when the distance becomes below a certain value or the object is in contact with the virtual control element, the information input/output control section performs a previously associated operation; and when the object approaches the device, when the distance becomes below a certain value or the object is in contact with the device, the information input/output control section operates the device. After the object has been stayed away from any of the virtual control elements or the devices for a certain period of time, the operation of the information input apparatus may be switched to a predetermined mode.

In addition, such a structure may be adopted that the information input/output control section divides the interface section into a display region where a graphical user interface (GUI) can be used and a region where the GUI cannot be used, and manages a position of an element constituting the GUI and an operation performed by the information input apparatus by using the element. Also, such a structure may be adopted that the object includes a pen-type input apparatus radiating the electromagnetic wave, the information input/output control section monitors a distance between the element constituting the GUI and the object, and when the distance becomes below a certain value or the object is in contact with the element constituting the GUI, the information input/output control section performs a previously associated operation. Also, when information is directly written in the display region using the object, the information input/output control section may carry out such a control that a line width is varied or a color tone is changed depending on the distance between the tip end portion of the object and the display region.

Furthermore, the information input/output control section may manage the position of the element constituting the GUI on the interface section and the operation according to the element performed by the information input apparatus. Also, such a structure may be adopted that the object includes a part of a human body radiating the electromagnetic wave, the information input/output control section monitors the distance between the element constituting the GUI and the object; and when the distance becomes below a certain value or the object is in contact with the element constituting the GUI, the information input/output control section performs a previously associated operation. Also, the information input/output control section may control the operation of the information input apparatus when a predetermined symbol is traced on the interface section using the object.

According to the present invention, by detecting the electromagnetic wave transmitted through the interface section, for example, an electromagnetic wave naturally radiated from an object having a temperature is used to detect a relative position of the object generating the electromagnetic wave with respect to the interface section. Then, based on information on a relative distance or positional relationship between the object generating the electromagnetic wave and the interface section, the operation of an apparatus or the like can be controlled. As a result, the following effects are expected to attain.

Regarding a technology for the position detection of the object in the vicinity of the interface section, it is possible to provide a method and apparatus for realizing the spatial position detection of the object without using a specific signal source or a scanning mechanism. Also, it is possible to provide an information input method and apparatus for processing the information on the positional relationship detected using the above-mentioned spatial position detection technology, in accordance with a predetermined interpretation method and for controlling the operation of an apparatus and the input states of information and a signal.

As long as the interface section has the characteristics of transmitting the electromagnetic wave used, it is unnecessary to provide a specific mechanical scanning mechanism for specifying the position of the object in the interface section, thereby allowing miniaturization of the apparatus with ease. For example, when a case of a display device is considered, eliminating the need to provide such a mechanical scanning mechanism maintains the maximum size of a display part that performs information input/output, making it possible to improve the flexibility in the apparatus layout.

A relative positional relationship between the object and the interface section is calculated, and therefore a shape of the interface section is not necessarily flat. As a result, application to position detection for an interface section having various kinds of shapes is facilitated.

With the information on the relative position relationship between the object and the interface section, manipulation of the information can be performed, so that the number of mechanical components such as a button and a switch can be reduced significantly, thereby realizing the miniaturization of the apparatus with ease.

The apparatus operation or the like can also be controlled in response to an action naturally performed by a human body or the environmental conditions around the information input apparatus, thus improving the operability and preventing the malfunction.

In the case where correction is performed on information on the position of the object to be detected by taking into a consideration distribution characteristics of the interface section itself of the apparatus or a surrounding environment, still more accurate position detection can be realized.

BEST MODE FOR CARRYING OUT THE INVENTION

Figure 1:
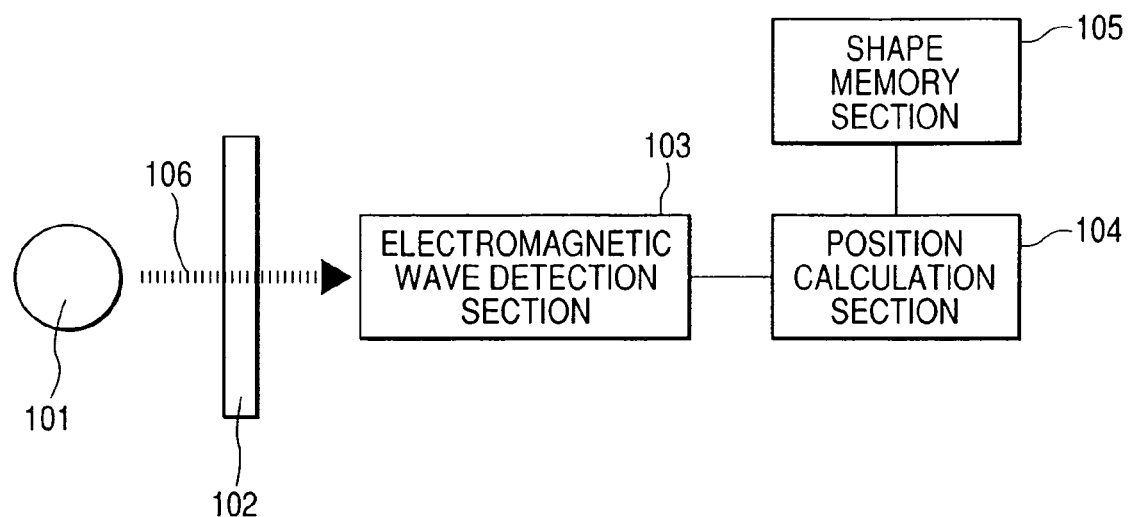
FIG. 1 is a schematic structure diagram showing an example of a spatial position detection apparatus according to the present invention.

An embodiment mode of the present invention will be described with reference to the accompanying drawings. The same reference numerals are used for the same components in the drawings.

FIG. 1 is a block diagram related to an embodiment mode of a spatial position detection apparatus for an object according to the present invention. As shown in FIG. 1, the spatial position detection apparatus according to this embodiment mode is composed of: an object 101 that radiates an electromagnetic wave 106 (such as a hand of a human body); an interface section 102 that transmits the electromagnetic wave 106; an electromagnetic wave detection section 103 for detecting the electromagnetic wave 106 transmitted through the interface section 102; a position calculation section 104 for calculating data on a relative spatial position of the object 101 with respect to the interface section 102 (this may be position coordinate data calculated at an arbitrary time or a mode of change over time in the position coordinate data) based on the output from the electromagnetic wave detection section 103; and a shape memory section 105 in which shape data of the interface section 102 is stored in advance.

Figure 2:
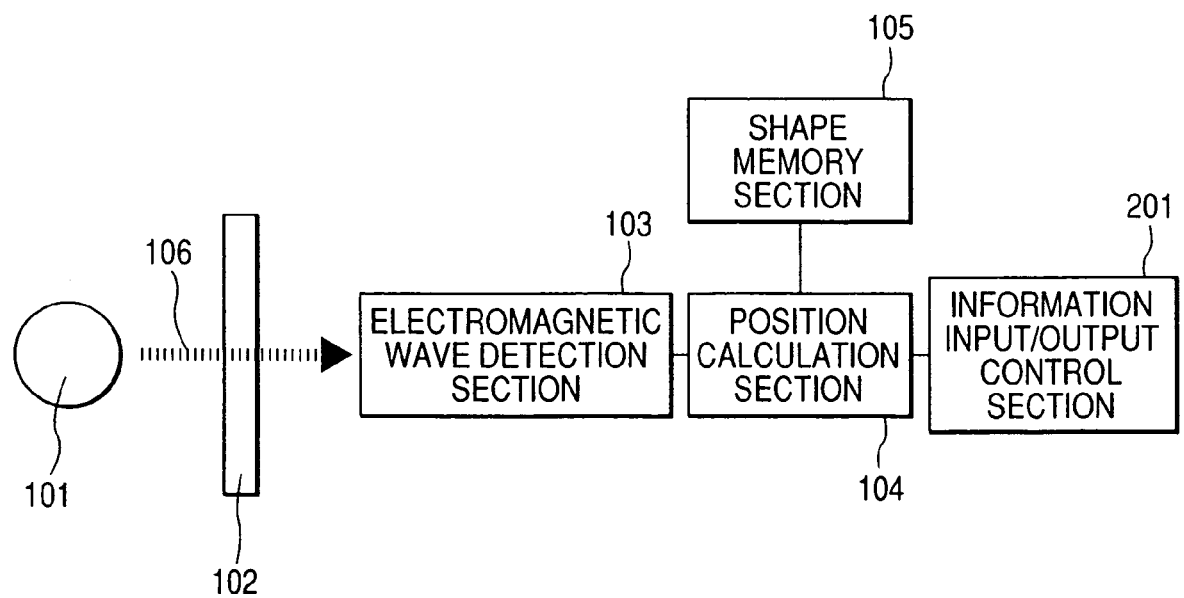
FIG. 2 is a schematic structure diagram showing an example of an information input apparatus according to the present invention.

The interface section 102 used in the present invention refers to a casing of the apparatus, an outer shell of an element, a part of the outer shell, or the like, which encloses the electromagnetic wave detection section 103, the position calculation section 104, the shape memory section 105, etc., and refers to a place where information is exchanged using the electromagnetic wave 106 transmitted through the interface section 102. Practical examples of the interface section 102 include: a display part of a touch panel; a package section of a mobile phone, mobile personal computer, or the like; and a section where a human body touches an individual element such as a button or a switch. However, the interface section 102 is not limited to those. In particular, when input/output of information is dealt with, as shown in FIG. 2, the spatial position detection apparatus may further enclose an information input/output control section 201 as a control section for generating some sort of response based on information on the relative position relationship between the object 101 and the interface section 102.

Typically, the electromagnetic wave 106 used in the present invention includes an electromagnetic wave occupying an arbitrary frequency band, in the frequency bandwidth from 30 GHz to 30 THz. The electromagnetic wave of this band is known to have electromagnetic wave property of being transmitted through an object to some extent as well as rectilinear characteristics (directivity) of light. It is also known that an object having a temperature (such as a hand of a human body) radiates an electromagnetic wave depending on a temperature T in Planck's formula as represented, for example, by the following formula.

$$Bv(T)=(2\ hv^3/c^2)/\{\exp(hv/kT)-1\}$$

Wherein Bv(T) is a spectral radiance, h is Planck's constant, v is the number of frequency, c is the velocity of light, k is Boltzmann's constant, T is an absolute temperature of the object. In the case where a part of a human body is assumed as the object 101 radiating the electromagnetic wave 106, it means that an electromagnetic wave spectrum is obtained according to the absolute temperature T of the part of the human body. In this embodiment mode, the object is assumed to be the part of the human body, but not limited to this.

Figure 3:
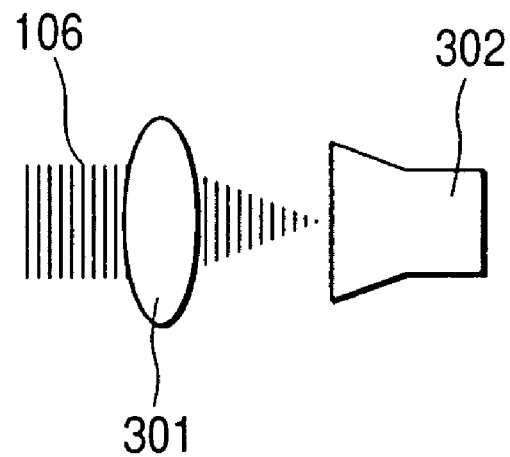
FIG. 3 is a diagram showing a structure example of an electromagnetic wave detection section.
Figure 4:
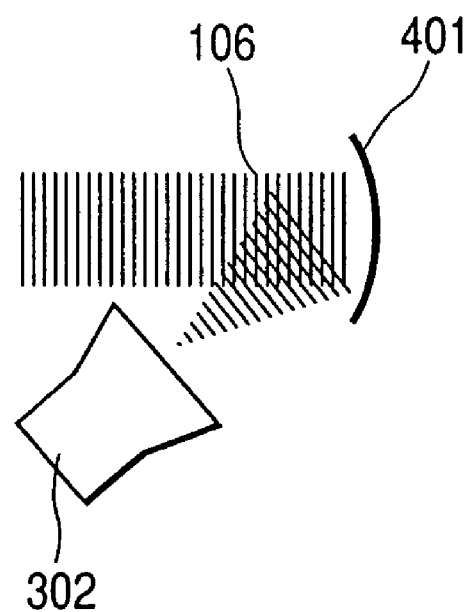
FIG. 4 is a diagram showing another structure example of the electromagnetic wave detection section.

FIG. 3 and FIG. 4 show structural examples of the electromagnetic wave detection section 103 for detecting the electromagnetic wave 106 transmitted through the interface section 102. As shown in those figures, the electromagnetic wave detection section 103 is typically composed of a focusing section 301 or 401 for focusing the electromagnetic wave 106 transmitted through the interface section 102 and a displacement detection section 302 for detecting a position of the electromagnetic wave 106 focused.

FIG. 3 shows an example of using a transmissive lens as the focusing section 301 for focusing the electromagnetic wave 106 of the electromagnetic wave detection section 103. In this case, a focus spot of the electromagnetic wave 106 is formed on a place in a direction of a propagation axis. As in the optical technology, in general, this focus spot changes in position according to an incident angle of the electromagnetic wave 106 entering the focusing section 301. Therefore, when the displacement detection section 302 is disposed in a region where the focus spot of the electromagnetic wave 106 is generated, angle information of the electromagnetic wave 106 reaching the displacement detection section 302 from the focusing section 301 can be obtained based on a position of the focus spot on the displacement detection section 302 and a positional relationship between the focusing section 301 and the displacement detection section 302. By referring to this angle information and a refractive index of the focusing section 301 with respect to the electromagnetic wave 106, the information on the position of the focus spot can be converted into information on the incident angle of the electromagnetic wave 106.

FIG. 4 shows an example of using a reflective mirror having a curved surface as the focusing section 401 for focusing the electromagnetic wave 106 of the electromagnetic wave detection section 103. In this case, as shown in the figure, the focus spot of the electromagnetic wave 106 is formed on a place off the propagation axis of the electromagnetic wave 106. As in the optical technology, in general, this focus spot changes in position according to an incident angle of the electromagnetic wave 106 entering the focusing section 401. Therefore, when the displacement detection section 302 is disposed in a region where the focus spot of the electromagnetic wave 106 is generated, reflection angle information of the electromagnetic wave 106 reaching the displacement detection section 302 from the focusing section 401 can be obtained based on a position of the focus spot on the displacement detection section 302 and a positional relationship between the focusing section 401 and the displacement detection section 302. Accordingly, by referring to this reflection angle information, the information on the position of the focus spot can be converted into information on the incident angle of the electromagnetic wave 106.

For example, when at least an antenna array composed of plural antenna elements each having a detection sensitivity for the frequency bandwidth of the electromagnetic wave 106 and an electromagnetic wave detection element such as a bolometer disposed corresponding to each of the antennas are used as the displacement detection section 302, the position of the focus spot is detected by monitoring an intensity of the antenna element that corresponds to the focus spot of the electromagnetic wave 106 and an intensity of the electromagnetic wave detection element. The structure of the displacement detection section 302 is not limited to this, and for example the displacement detection section 302 can be composed of the electromagnetic wave detection element alone.

Each of the above methods shows an example of a method of calculating an incident angle of the electromagnetic wave 106 transmitted through the interface section 102, but the method is not limited to those methods.

The shape memory section 105 is an apparatus for storing a shape of the interface section 102 as spatial coordinate data in advance. Reference coordinates of the spatial coordinates of the interface section 102 are set to a point opposing the object 101 radiating the electromagnetic wave 106 via the interface section 102, an arbitrary point enclosed by the interface section 102, or the like.

The position calculation section 104 calculates spatial position coordinates of the object 101 based on incident angle information of the electromagnetic wave 106 transmitted through the interface section 102 obtained by the electromagnetic wave detection section 103, intensity information of the focus spot, plural pieces of incident angle information of the electromagnetic wave 106 transmitted through the interface section 102, etc. Moreover, the position calculation section 104 refers to the spatial coordinate data of the interface section 102 previously stored in the shape memory section 105 and converts the calculated spatial position coordinates of the object 101 into information on a relative spatial position of the object 101 with respect to the interface section 102 for output.

Hereinafter, with reference to FIG. 5, FIG. 6, FIG. 7, and FIG. 8, a description will be given to a detection method for information on an actual relative position of the object 101 with respect to the interface section 102 and a structure example of the spatial position detection apparatus. Here, as a method of representing the spatial coordinates of the object 101, as shown in the figures, while the focusing section 301 is set as the origin, with respect to the plane of paper, a normal line direction is represented by an x-axis, a vertical direction is represented by a y-axis, and a lateral direction is represented by a z-axis. In addition, with respect to the focusing section 301 as the origin, an angle defined in an xy-plane is assigned θ and an angle defined in an xz-plane is assigned φ.

Figure 5:
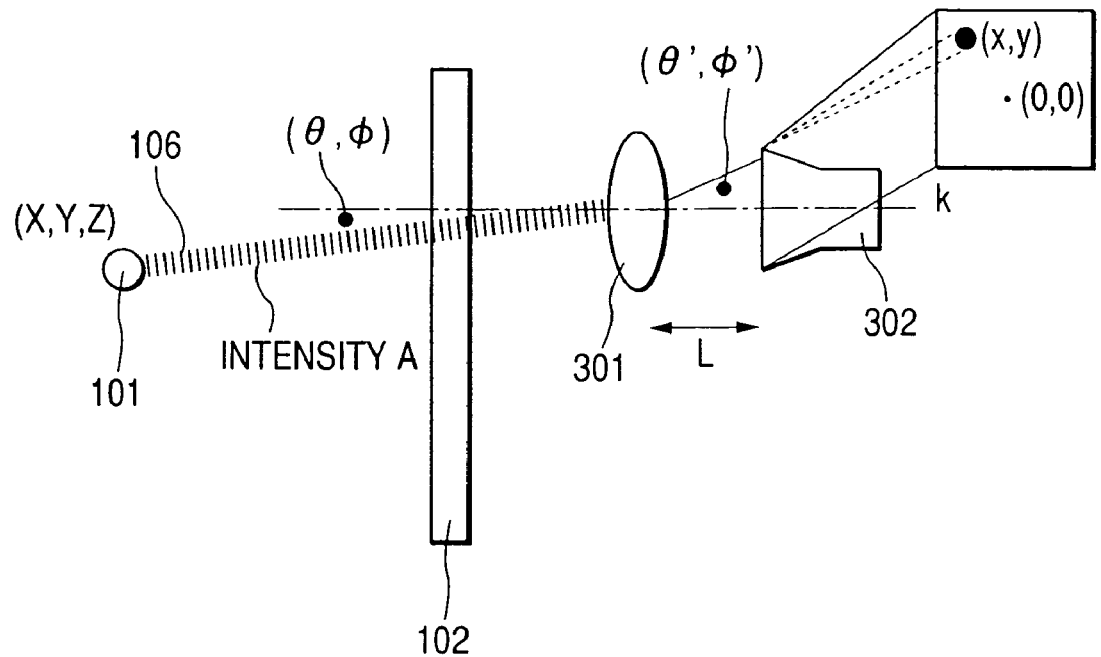
FIG. 5 is a diagram for explaining a detection method for relative position information of an object with respect to an interface section and an example of a structure related to the spatial position detection apparatus.

In FIG. 5, a human body is used as the object 101 and a casing of the apparatus is used as the interface section 102. Therefore, in actuality, the focusing section 301 and the displacement detection section 302 are present inside the casing. An antenna array and plural electromagnetic wave detection elements are utilized as the displacement detection section 302. The sensitivity of the antenna array is designed to exist in a bandwidth of the electromagnetic wave radiated from the human body. A silicon lens is employed as the focusing section 301. The apparatus structure is not limited to this. The focusing section 301 and the displacement detection section 302 are disposed away from each other at a distance L along a line k passing through the center of each element.

In FIG. 5, one pair of the focusing section 301 and the displacement detection section 302 is used to detect spatial position coordinates (X, Y, Z) of the object 101 present in the vicinity of the interface section 102. The object 101 is the human body and thus naturally radiates the electromagnetic wave 106. The electromagnetic wave 106 forms a focus spot on the displacement detection section 302 via the interface section 102 and the focusing section 301. Referring to the intensity distribution of the antenna array and plural electromagnetic wave detection elements constituting the displacement detection section 302 specifies the focus spot of the electromagnetic wave 106. Then, by monitoring the signal intensities of the electromagnetic wave detection elements corresponding to the respective antennas constituting the antenna array, a position of the electromagnetic wave detection element outputting the strongest output signal is set as the center position of the focus spot (x, y). Here, (x, y) represents coordinates with the center of the displacement detection section 302 set as the origin (0, 0). The center coordinates are assumed to be points on a line passing through the center line k described above. The distance L between the focusing section 301 and the displacement detection section 302 is already known, so that it is possible to acquire an exit angle (θ', φ') of the electromagnetic wave 106 reaching the displacement detection section 302 from the focusing section 301 based on the center position (x, y) of the focus spot and the distance L. As described above, the focusing section 301 is composed of the silicon lens, which is a transmissive lens. Therefore, an understanding of the exit angle (θ', φ') from the lens enables the acquisition of an incident angle to the lens, that is, an incident angle (θ, φ) of the electromagnetic wave 106 radiated from the object 101.

An signal intensity A of the focus spot detected by the displacement detection section 302 changes depending on a propagation distance the electromagnetic wave 106 radiated from the object 101. Therefore, based on the incident angle (θ, φ) of the electromagnetic wave 106 and the signal intensity A of the focus spot, the spatial position coordinates (X, Y, Z) of the object 101 can be acquired. Because the signal intensity A acquired may be different according to the object 101 used, the following structure may be provided. In this structure, at an initial stage of the use, a relationship between the signal intensity of the object 101 and the propagation distance in a known position, e.g., a specific position of the interface section 102, is measured, and then correction is performed on the relationship between the signal intensity A of the focus spot and the propagation distance of the electromagnetic wave. After that, the position calculation section 104 refers to the spatial coordinate data of the interface section 102 previously stored in the shape memory section 105, chooses an intersecting point where the shortest normal line out of the normal lines set in the interface section 102 passing through the positional coordinates (X, Y, Z) of the object 101 intersects the interface section 102, and calculates relative position information of the object 101 with respect to the intersecting point.

In this way, the spatial position detection apparatus of this embodiment mode detects the spatial position coordinates of the object 101 present in the vicinity of the interface section 102 and thus can convert the coordinates into the relative position information of the object 101 with respect to the interface section 102.

Figure 6:
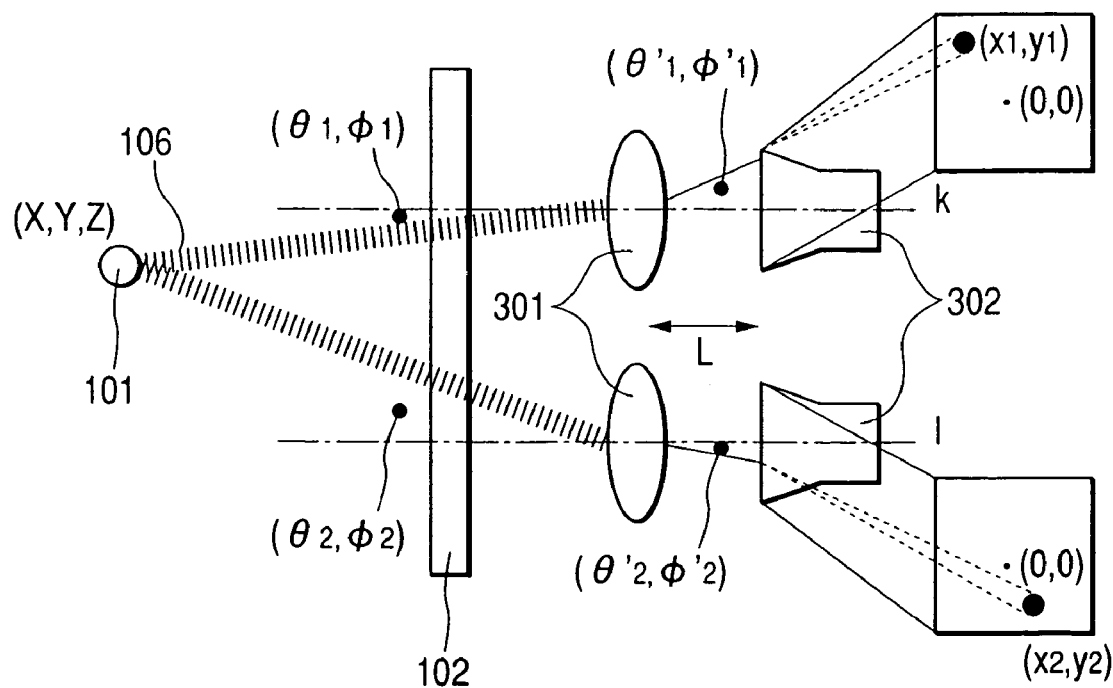
FIG. 6 is a diagram for explaining the detection method for the relative position information of the object with respect to the interface section and another example of the structure related to the spatial position detection apparatus.

FIG. 6 is a diagram showing the detection method for the relative position information of the object 101 with respect to the interface section 102 and another example of the structure related to the spatial position detection apparatus.

In FIG. 6 as well, a human body is used as the object 101 and a casing of the apparatus is employed as the interface section 102. The same components of FIG. 5 constitute the focusing section 301 and the displacement detection section 302. The focusing sections 301 and the displacement detection sections 302 are disposed away from each other at the distance L along with lines k and l passing through the center of the elements, respectively.

In FIG. 6, two sets of the focusing sections 301 and the displacement detection sections 302 are used to detect the spatial position coordinates (X, Y, Z) of the object 101 present in the vicinity of the interface section 102. The electromagnetic wave 106 naturally radiated from the object 101 forms focus spots on the two displacement detection sections 302 via the interface section 102 and the two focusing sections 301. Each of the focus spots of the electromagnetic wave 106 is specified by referring to the intensity distribution of the antenna array and plural electromagnetic wave detection elements constituting the displacement detection sections 302. Then, the signal intensities of the electromagnetic wave detection elements corresponding to the respective antennas that constitute the antenna array are monitored, and positions of the electromagnetic wave detection elements outputting the strongest output signals are set as the center positions $(x_1, y_1)$ and $(x_2, y_2)$ of the focus spots, respectively. Here, $(x_1, y_1)$ and $(x_2, y_2)$ represent coordinates with the centers of the respective displacement detection sections 302 set as (0, 0). The center coordinates are points on a line passing through the above-mentioned center lines k and l, respectively. Since the distance L between the focusing sections 301 and the displacement detection sections 302 is already known, exit angles $(\theta_1', \phi_1')$ and $(\theta_2', \phi_2')$ of the electromagnetic wave 106 reaching the displacement detection sections 302 from the focusing sections 301 can be determined based on the center positions $(x_1, y_1)$ and $(x_2, Y_2)$ of the focus spots and the distance L. The focusing sections 301 are each composed of the silicon lens that is a transmissive lens, and the determination of the exit angles from the lenses $(\theta_1', \phi_1')$ and $(\theta_2', \phi_2')$ enables the acquisition of the respective incident angles to the lenses, that is, the incident angles $(\theta_1, \phi_1)$ and $(\theta_2, \phi_2)$ of the electromagnetic wave 106 radiated from the object 101.

In this embodiment mode, the plural angles from the respective focusing sections 301 to the object 101 are calculated, so that the position of the object 101 can be found. Here, based on two incident angles $(\theta_1, \phi_1)$ and $(\theta_2, \phi_2)$ of the electromagnetic wave 106 entering the respective focusing sections 301, the spatial position coordinates (X, Y, Z) of the object 101 can be calculated by means of the trigonometrical survey. After that, the position calculation section 104 refers to the spatial coordinate data of the interface section 102 previously stored in the shape memory section 105, chooses an intersecting point where the shortest normal line out of the normal lines set in the interface section 102 passing through the positional coordinates (X, Y, Z) of the object 101 intersects the interface section 102, and calculates the relative position information of the object 101 with respect to this intersecting point.

In this way, the spatial position detection apparatus of this embodiment mode detects the spatial position coordinates of the object 101 present in the vicinity of the interface section 102 and thus can convert the coordinates into the relative position information of the object 101 with respect to the interface section 102.

Figure 7:
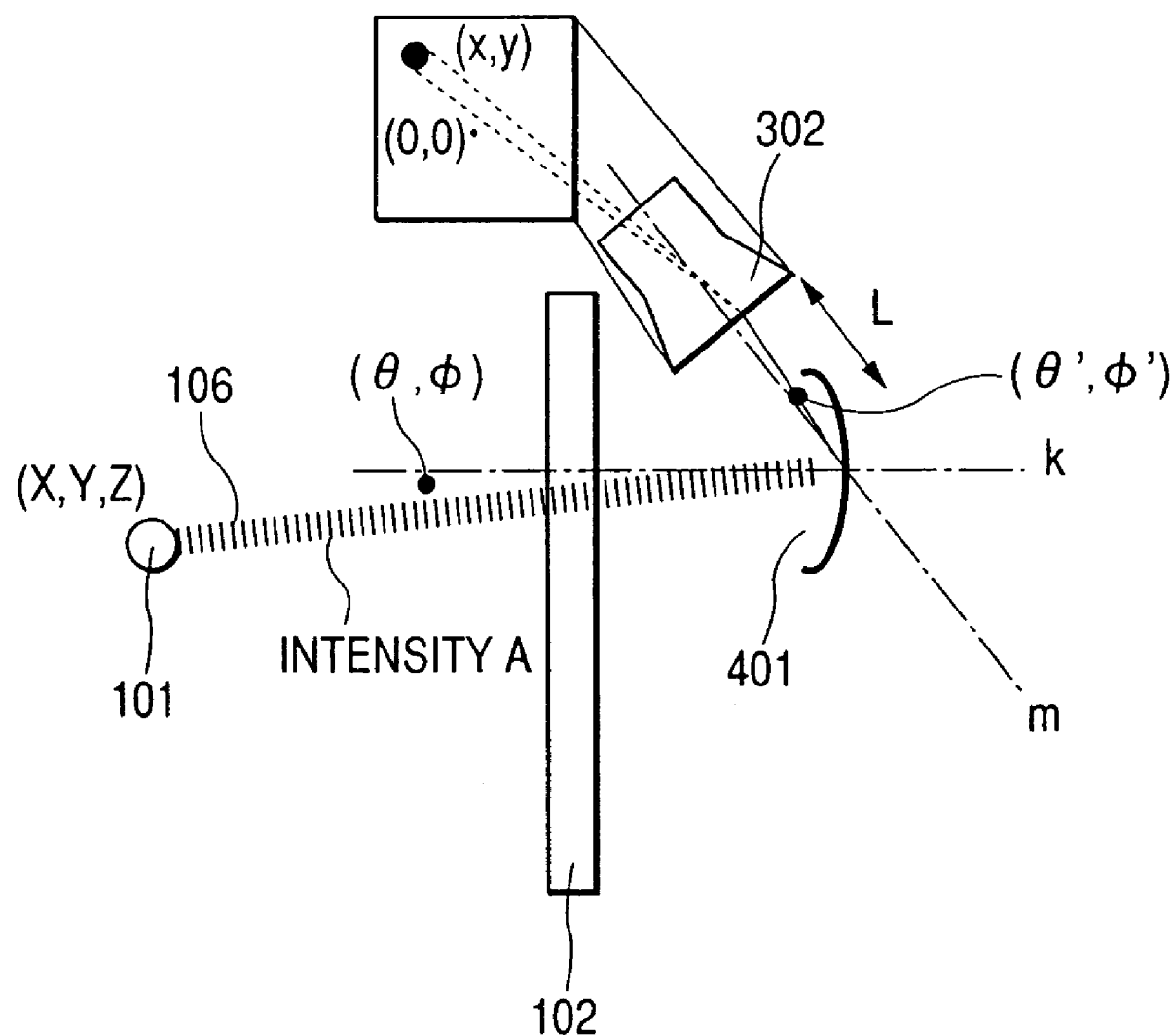
FIG. 7 is a diagram for explaining the detection method for the relative position information of the object with respect to the interface section and still another example of the structure related to the spatial position detection apparatus.

FIG. 7 is a diagram showing the detection method for the relative position information of the object 101 with respect to the interface section 102 and still another example of the structure related to the spatial position detection apparatus.

Also in FIG. 7, a human body is used as the object 101 and a casing of the apparatus is employed as the interface section 102. The displacement detection section 302 is the same as that of FIG. 5. Used as the focusing section 401 is an off-axis parabolic mirror. The apparatus structure is not limited to the above. The displacement detection section 302 is disposed away from an intersecting point of the line k passing through the center of the focusing section 401 and a line m passing through the center of the displacement detection section 302 at the distance L along the center line m.

In FIG. 7, to detect the spatial position coordinates (X, Y, Z) of the object 101 present in the vicinity of the interface section 102, one set of the focusing section 401 and the displacement detection section 302 is used. The calculation method for the center position (x, y) of the focus spot is the same as that in the case of FIG. 5. The distance L between the focusing section 401 and the displacement detection section 302 is already known, and therefore the reflection angle (θ', φ') of the electromagnetic wave 106 reaching the displacement detection section 302 from the focusing section 401 can be determined based on the center position (x, y) of the focus spot and the distance L. As described above, the focusing section 401 is composed of the off-axis parabolic mirror having a curved surface, which is a reflective mirror. Therefore, the determination of the reflection angle (θ', φ') from the mirror enables the acquisition of the incident angle to the mirror, i.e., the incident angle (θ, φ) of the electromagnetic wave 106 radiated from the object 101.

The calculation method for the relative position information of the object 101 with respect to the interface section 102 is as described in the embodiment mode of FIG. 5. In this way, with the spatial position detection apparatus of this embodiment mode as well, the spatial position coordinates of the object 101 present in the vicinity of the interface section 102 are detected, which can be converted into the relative position information of the object 101 with respect to the interface section 102.

Figure 8:
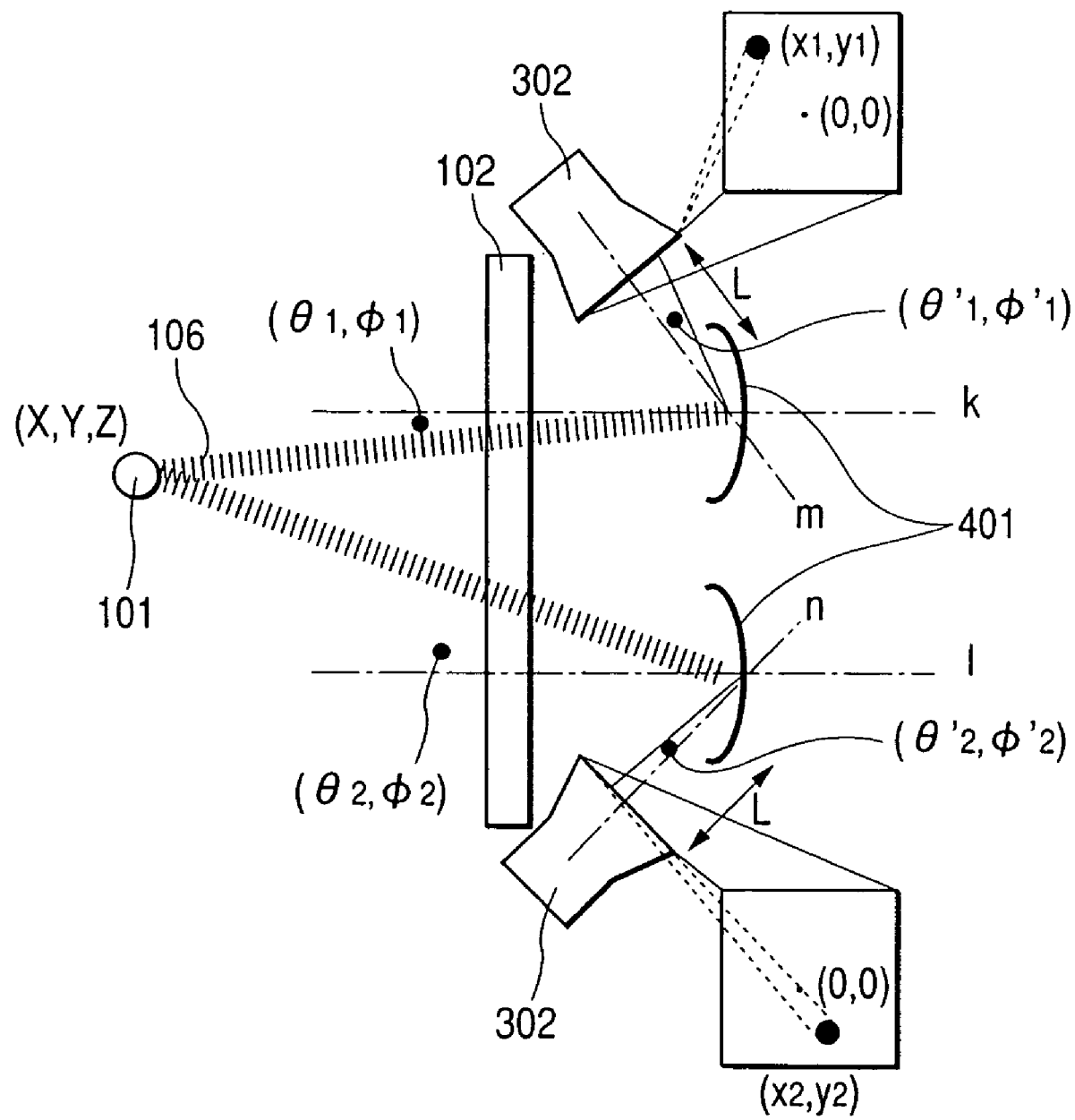
FIG. 8 is a diagram for explaining the detection method for the relative position information of the object with respect to the interface section and yet still another example of the structure related to the spatial position detection apparatus.

FIG. 8 is a diagram showing the detection method for the relative position information of the object 101 with respect to the interface section 102 and yet still another example of the structure related to the spatial position detection apparatus.

In FIG. 8 as well, a human body is used as the object 101 and a casing of the apparatus is utilized as the interface section 102. The apparatus structure of the focusing section 401 and the displacement detection section 302 is identical to that of FIG. 7. The displacement detection sections 302 are disposed away from intersecting points of the lines k and l passing through the centers of the focusing sections 401 and lines m and n which pass through the centers of the displacement detection sections 302 at the distance L along the center lines m and n, respectively.

In FIG. 8, to detect the spatial position coordinates (X, Y, Z) of the object 101 present in the vicinity of the interface section 102, two sets of the focusing sections 401 and the displacement detection sections 302 are employed. The calculation method for the center positions $(x_1, y_1)$ and $(x_2, y_2)$ of the focus spots on the electromagnetic wave detection elements is as described in the above embodiment modes. Then, based on the center positions $(x_1, y_1)$ and $(x_2, y_2)$ of the focus spots and the distance L, the reflection angles $(\theta_1', \phi_1')$ and $(\theta_2', \phi_2')$ of the electromagnetic wave 106 reaching the displacement detection section 302 from the focusing section 401 are calculated, and the calculation method for the incident angles to the mirror, that is, the incident angles $(\theta_1, \phi_1)$ and $(\theta_2, \phi_2)$ of the electromagnetic wave 106 radiated from the object 101 is substantially the same as that of the example of FIG. 6. The method of calculating the relative position information of the object 101 is as described in the example of FIG. 6.

In this way, the spatial position detection apparatus of this embodiment mode detects the spatial position coordinates of the object 101 present in the vicinity of the interface section 102 and thus can convert the coordinates into the relative position information of the object 101 with respect to the interface section 102.

Figure 9:
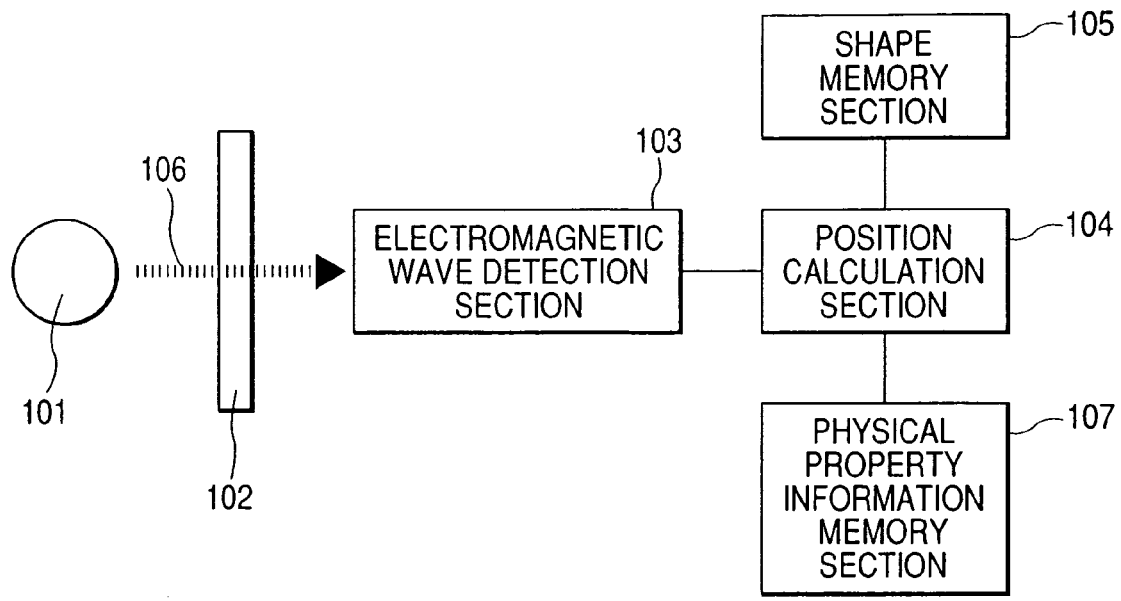
FIG. 9 is a schematic structure diagram showing a further example of the spatial position detection apparatus according to the present invention.

Next, FIG. 9 is a block diagram showing a further embodiment mode of the spatial position detection apparatus for the object according to the present invention. The embodiment mode of FIG. 9 further includes a physical property information memory section 107 for storing the physical property information of the interface section 102 in addition to the structure of FIG. 1. This physical property includes physical properties of a shape possessed by the interface section 102 (such as a thickness distribution), a dielectric constant, and an electromagnetic wave absorptivity, but is not limited to the above.

Features of this embodiment mode are exemplified as follows. It is assumed that the interface section 102 transmitting the electromagnetic wave 106 or a part of the interface section 102 is composed of a certain dielectric material or composed of an electromagnetic wave absorptive material. Then, as the environment surrounding the interface section 102 changes, the propagation characteristics of the electromagnetic wave 106 transmitted through the interface section 102 are changed. For instance, as in FIG. 11, when the interface section 102 is composed of a dielectric material having a certain thickness, the electromagnetic wave 106 entering the interface section 102 is refracted in the process of being transmitted through the interface section 102, and the propagation path leading to the electromagnetic wave detection section 103 changes. This phenomenon will have a larger influence particularly with increasing proximity to the vicinity of the interface section 102. This change of the propagation path might be a cause of errors for the position information of the object 101. In view of the above, in this embodiment mode, regarding the spatial position coordinates of the object 101 acquired by the position calculation section 104, the physical property information memory section 107 is referred to, and the physical property information of the interface section 102 is acquired; influences on the propagation characteristics of the electromagnetic wave 106 thus acquired are taken into a consideration, and correction is performed on the calculation result. In this way, more accurate position information of the object 101 is acquired.

Figure 11:
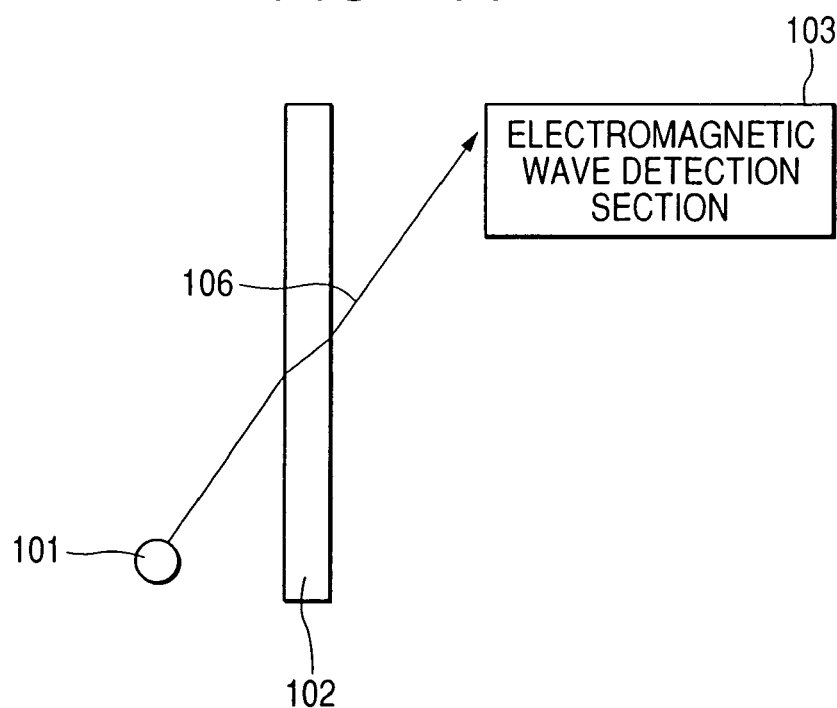
FIG. 11 is a diagram for explaining an influence of a dielectric constant of the interface section on a propagation path of an electromagnetic wave.

This concept can be applied to all of the above-mentioned embodiment modes. For example, as in FIG. 6, in a case of the apparatus for acquiring the position of the object 101 by means of the trigonometrical survey, it is assumed that the interface section 102 is composed of a dielectric material having a certain thickness and the propagation path of the electromagnetic wave 106 changes as shown in FIG. 11. In such a case, for the respective propagation paths of the electromagnetic wave 106 in FIG. 6, the information on the dielectric constant and thickness of the interface section 102 stored in the physical property information memory section 107 is referred to, and is converted as appropriate taking the influence of the refraction into consideration, and correction is performed on the position information of the object 101. As in FIG. 5, also when the signal intensity of the focus spot which varies depending on the propagation distance of the electromagnetic wave 106 radiated from the object 101 is used, the information on the electromagnetic wave absorptivity in the transmissive part of the interface section 102 is referred to, and correction may be performed on the position information of the object 101 if required.

Embodiments

Figure 10:
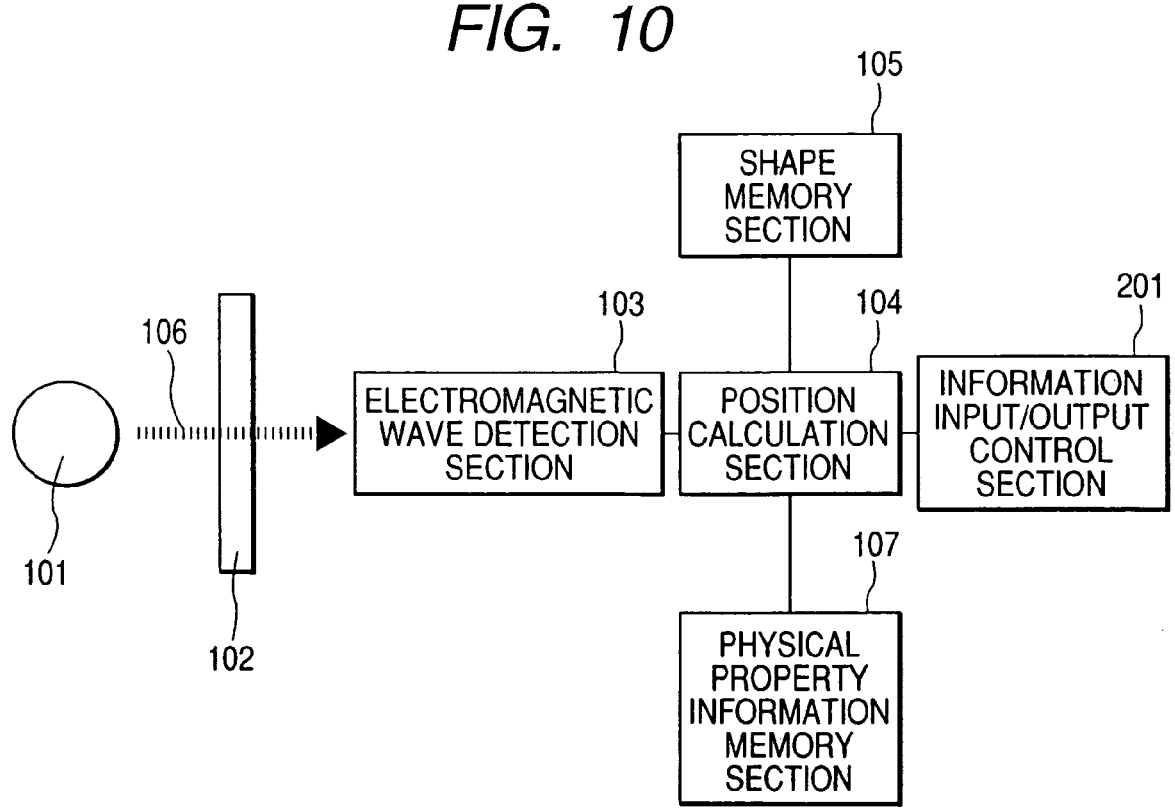
FIG. 10 is a schematic structure diagram showing another example of the information input apparatus according to the present invention.

Hereinafter, embodiments of the present invention in which the spatial position detection apparatus described above is adapted to the information input apparatuses of FIG. 2 and FIG. 10 are shown. Here, an information input/output control section 201 is used to manipulate information and a signal based on the information on the relative positional relationship between the object 101 and the interface section 102.

Embodiment 1

Figure 12:
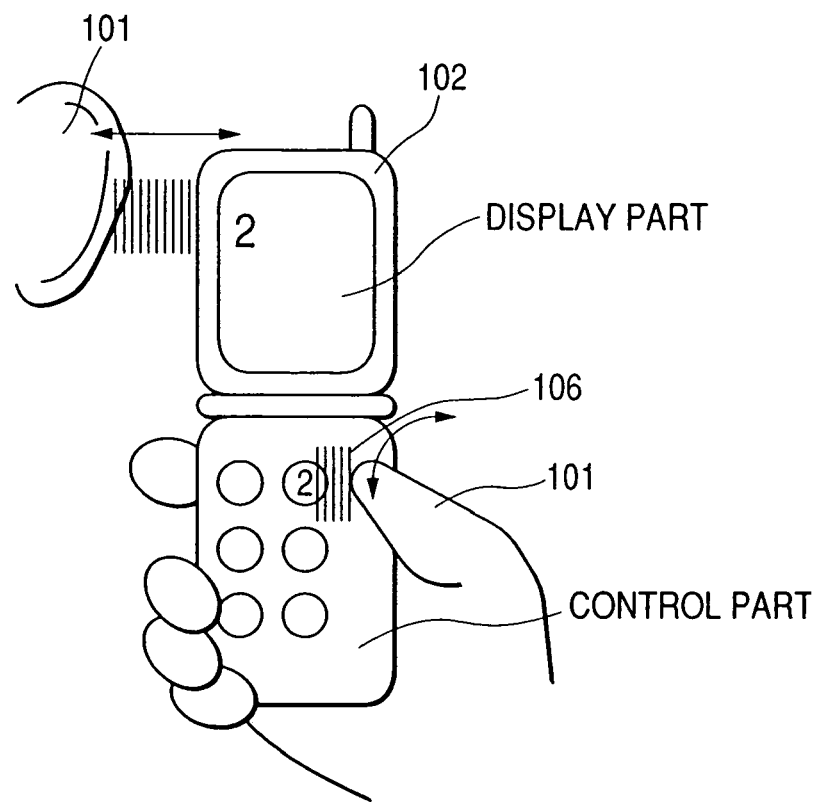
FIG. 12 is a diagram showing an application example of the information input apparatus according to Embodiment 1.

Here, an adaptation example to a portable information terminal apparatus such as a mobile phone or a mobile computer is described as the above-mentioned information input apparatus. FIG. 12 shows a structure of the portable information terminal apparatus in this embodiment. Here, for convenience of explanation, a mobile phone is used but this embodiment is not limited to this. In this embodiment, a part of a human body is used as each of the objects 101 and a casing of the portable information terminal apparatus is used as the interface section 102. The electromagnetic wave detection section 103, the position calculation section 104, the shape memory section 105, the information input/output control section 201, (and further, the shape memory section 107) which are structural components of the information input apparatus are enclosed inside the casing of the portable information terminal apparatus.

As described above, the shape memory section 105 stores outer shape information of the casing in advance. Furthermore, as in this embodiment, when used in the information terminal apparatus, the shape memory section 105 shares the position information of the components constituting the casing (input button, display part, earpiece part, etc.) with the information input/output control section 201. The information input/output control section 201 monitors information on the relative distance relationship between each component of the casing and each part of the human body, and controls the operation of the portable information terminal apparatus according to the distance relationship information. This relative distance relationship is detected using the electromagnetic wave 106 radiated from each part of the human body as in a manner described above. Also, a heat member for heating a part of the human body may be attached to the part of the human body as the need arises.

For instance, as in FIG. 12, when a finger 101 approaches the input button corresponding to "2" among the components constituting the casing, the information input/output control section 201 monitors the relative distance relationship between the input button and the fingertip, and information input is effected in such a manner that an input state is achieved when the distance becomes below a certain value (or when the fingertip comes into contact with the input button). Depending on the circumstances, the information may be displayed on a display part.

In addition, a structure may be adopted in which, as an ear 101 approaches the earpiece part among the components constituting the casing, the information input/output control section 201 monitors the relative distance relationship between the earpiece part and the ear, and controls the operation of the portable information terminal apparatus in such a manner that call reception becomes possible when the distance becomes below a certain value (or when the ear comes into contact with the earpiece part).

In addition, the operation can also be controlled based on the environmental conditions around the portable information terminal apparatus such that, when the casing does not receive radiation of the electromagnetic wave 106 from the human body for a given period of time, in other words, when this portable information terminal apparatus is not being used, a power saving mode is activated while monitoring the change over time in this relative distance relationship.

In the above structure, when the physical property information memory section 107 is provided, the following structure can be adopted. The physical property information memory section 107 stores information on the physical property distribution of the casing or components constituting the casing in advance, and if required correction is performed on the position information on each part of the human body. For instance, as the means for this, performing a zero-point correction by contacting several areas of the interface section 102 is conceivable. In addition, there may be provided a function of acquiring the physical property information again when the environment surrounding the interface section 102 changes, such as when an accessory is attached, a paint is applied, or a cover for keeping the casing is separately attached to the casing, or in a case of a component often detached such as the accessory or the cover, a function of switching the physical property information depending on the presence or absence of the cover may be provided. Also, a function of performing correction on the individual difference of the object 101 to be operated may be provided.

Embodiment 2

Figure 13:
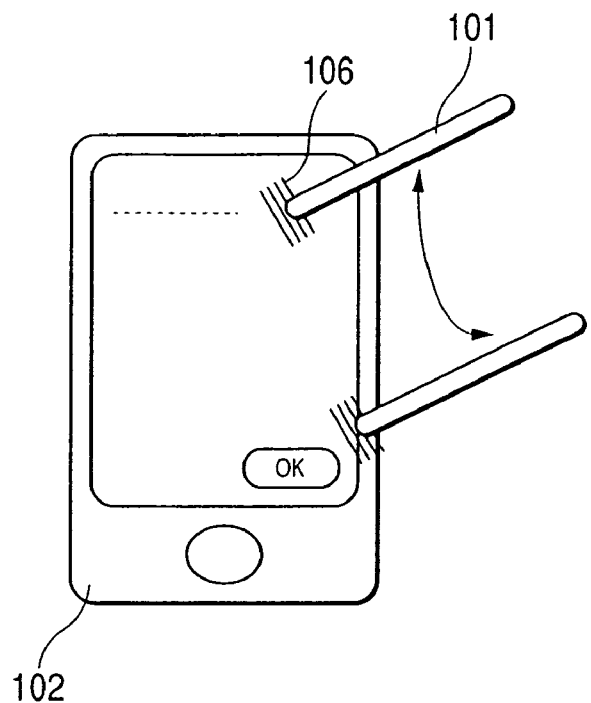
FIG. 13 is a diagram showing an application example of the information input apparatus according to Embodiment 2.

Here, there is shown an adaptation example to an information terminal apparatus endowed with a pen input function among portable information terminal apparatuses such as a personal digital assistance (PDA) as the above-mentioned information input apparatus. FIG. 13 shows a structure of the information terminal apparatus endowed with the pen input function of this embodiment. A pen radiating the electromagnetic wave 106 is used as the object 101 in this embodiment. Used as the interface section 102 is a casing of the information terminal apparatus endowed with the pen input function. Components constituting the information input apparatus, namely, the electromagnetic wave detection section 103, the position calculation section 104, the shape memory section 105, and the information input/output control section 201 (and further, the physical property information memory section 107) are enclosed inside the casing of the information terminal apparatus endowed with the pen input function.

As described above, the shape memory section 105 stores outer shape information of the casing in advance. Furthermore, as in this embodiment, when used in the information terminal apparatus endowed with the pen input function, the shape memory section 105 shares the position information of writable and non-writable regions on the display part or the like with the information input/output control section 201. The information input/output control section 201 manages the position information of a graphical user interface (GUI) displayed on the display. The information input/output control section 201 also monitors the relative distance relationship between the writable region and the pen tip, and manipulates the information according to the distance relationship information. The relative distance relationship is detected using the electromagnetic wave 106 radiated from the pen tip in the above-mentioned manner. Also, the pen may have a function of heating the pen tip if needed.

For example, as in FIG. 13, as the pen tip approaches an "on" button region in the GUI displayed on the display, the information input/output control section 201 monitors the relative distance relationship between the button region and the pen tip. When the distance becomes below a certain value (or the pen tip comes into contact with the button region), a selection state is achieved, and the information input/output control section 201 controls the operation of the GUI so as to perform a predetermined operation. Also, a function of drag, double click, or the like may also be used by using the combination of the selection state and the non-selection state.

For inputting information on the display, when the pen tip approaches an inputtable region on the display, the information input/output control section 201 monitors the relative distance relationship of the inputtable region and the pen tip. When the distance becomes below a certain value (or the pen tip comes into contact with the inputtable region), an inputtable state is achieved, and the information input/output control section 201 controls the information input/output state so as to perform information input or the like. In particular, at the time of the information inputtable state, it is possible to perform control intuitively, such as to make a line thicker or darker in color when the pen tip is pressed in, for example, based on the position of the pen tip.

In the above structure as well, when the physical property information memory section 107 is provided, the following structure can be adopted. The physical property information memory section 107 stores information on the physical property distribution of the casing or components constituting the casing in advance, and as the occasion demands, correction is performed on the position information of the pen tip. For example, as the means for this, performing a zero-point correction by contacting several areas of the interface section 102 is conceivable. There may be provided a function of acquiring the distribution information again when the environment surrounding the interface section 102 changes, such as when a protective filter is attached or a protective sheet is applied to the casing, or in a case of a component often detached such as the protective filter, a function of switching the distribution information depending on the presence or absence of the protective filter may be provided. Also, a function of performing correction on the individual difference of the object 101 to be operated may be provided.

Embodiment 3

Figure 14:
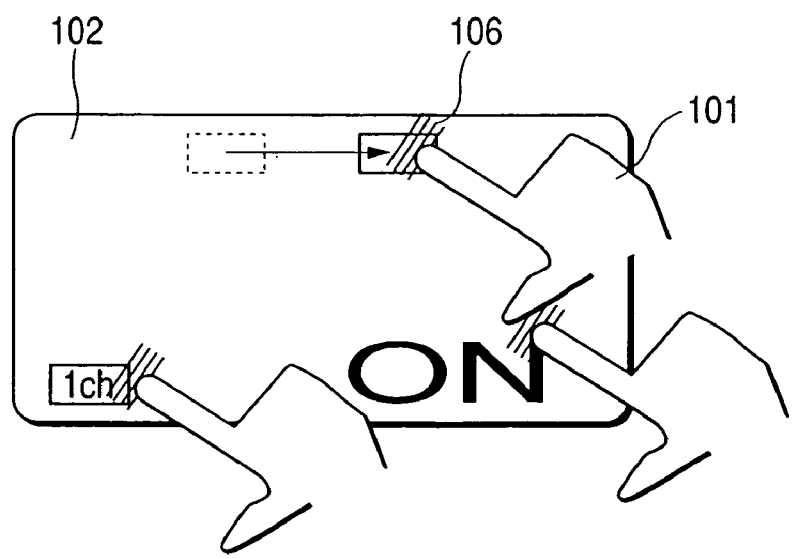
FIG. 14 is a diagram showing an application example of the information input apparatus according to Embodiment 3.

Here, there is shown an adaptation example to a television set, a personal computer, and other display devices having a touch panel as the above-mentioned information input apparatus. FIG. 14 shows a structure of the information terminal apparatus endowed with the touch panel input function added to the television set as the display device of this embodiment. A part of a human body is used as the object 101 in this embodiment. Used as the interface section 102 is a display of the television set. Components constituting the information input apparatus, including the electromagnetic wave detection section 103, the position calculation section 104, the shape memory section 105, the information input/output control section 201 (and further, the physical property information memory section 107) are enclosed inside the casing of the display device.

As described above, the shape memory section 105 stores outer shape information of the casing in advance. Furthermore, as in this embodiment, when used in the display device, the shape memory section 105 shares the position information of a display region with the information input/output control section 201. The information input/output control section 201 manages the position information of the GUI displayed on the display. The information input/output control section 201 also monitors the relative distance relationship between the writable region and a fingertip, and manipulates the information according to the distance relationship information. The relative distance relationship is detected using the electromagnetic wave 106 radiated from the fingertip in the above-mentioned manner. Also, the fingertip may be equipped with a heat member having a function of heating the fingertip when needed.

For instance, as in FIG. 14, when the fingertip approaches a button region "1ch" in the GUI displayed on the display of the television set, the information input/output control section 201 monitors the relative distance relationship between the button region and the fingertip. When the distance becomes below a certain value (or the fingertip comes into contact with the button region), a selection state is achieved, and the information input/output control section 201 controls the operation of the display device in such a manner that a screen image of a set frequency is displayed on the display. Also, those button regions can be changed into a desired GUI layout by dragging a button region being in the selection state to an arbitrary position.

In addition, in a state where the relative distance between the fingertip and the display is lower than a certain value (or the fingertip comes into contact with the display), the apparatus operation can be controlled by the operation of the human body in such a manner that the power source of the display device is turned on by tracing "on" with the fingertip as shown in FIG. 14.

In the above structure as well, when the physical property information memory section 107 is provided, the following manner can be adopted. The physical property information memory section 107 stores information on the physical property distribution of the casing or elements constituting the casing in advance, and as the occasion demands, correction is performed on the position information of the fingertip. For example, as the possible means for this includes performing a zero-point correction by contacting several areas of the interface section 102. In the case where the environment surrounding the interface section 102 is changed in such a manner that a protective filter is attached or a protective sheet is applied to the casing, a function of acquiring the distribution information again may be provided, or in a case of a component often detached such as the protective filter, a function of switching the distribution information depending on the presence or absence of the protective filter may be provided. Also, a function of performing correction on the individual difference of the object 101 to be operated may be provided.

This application claims priority from Japanese Patent Application No. 2003-322137 filed Sep. 12, 2003, which is hereby incorporated by reference herein.

The invention claimed is:

1. A spatial position detection method for detecting information on a relative spatial position of an object with respect to an interface section having an arbitrary shape and dealing with transmission of information and a signal from one side to the other side of the interface section, the spatial position detection method comprising:
    detecting an electromagnetic wave radiated from the object and transmitted through the interface section, the electromagnetic wave having a frequency bandwidth that is arbitrarily selected within a range from 30 GHz to 30 THz; and
    detecting a relative spatial position of the object with respect to the interface section by calculating information on spatial position coordinates of the object based on a result of the detecting.

2. A spatial position detection method according to claim 1, wherein the electromagnetic wave is detected by calculating a position of a focus spot resulting from focusing of the electromagnetic wave radiated from the object and transmitted through the interface section.

3. A spatial position detection method according to claim 2, wherein a position in the focus spot having a highest signal intensity in an intensity distribution of the focus spot is set as the position of the focus spot, an incident angle of the electromagnetic wave radiated from the object and entering the interface section is calculated based on the position of the focus spot and optical characteristics exhibited during the focusing of the electromagnetic wave, and information on spatial position coordinates of the object is calculated based on intensity of the focus spot and the incident angle of the electromagnetic wave radiated from the object.

4. A spatial position detection method according to claim 2, wherein positions of plural focus spots on predetermined surfaces caused by respectively focusing the electromagnetic wave radiated from the object are calculated, positions in the focus spots having a highest signal intensity in an intensity distribution of the focus spots are each set as the positions of the focus spots, plural incident angles of the electromagnetic wave radiated from the object and entering the interface section are calculated based on the positions of the plural focus spots and optical characteristics exhibited during the focusing of the electromagnetic wave, and information on spatial position coordinates of the object is calculated based on the plural incident angles of the electromagnetic wave.

5. A spatial position detection method according to claim 1, wherein shape information of the interface section is stored as spatial coordinate data in advance, and relative spatial position information of the object with respect to the interface section is calculated based on the spatial position coordinates of the object and the stored spatial coordinate data of the interface section.

6. A spatial position detection method according to claim 1, wherein information on a physical property distribution of the interface section is stored in advance, an influence exerted by the interface section to propagation characteristics of the electromagnetic wave in incident angle positions of the electromagnetic wave on the interface section is taken into a consideration, and correction is performed on the calculation of the information on the spatial position of the object.

7. An information input method that employs the spatial position detection method according to claim 1, comprising:
    monitoring information on a relative distance between an arbitrary position of the interface section and the object;
    processing a result of the monitoring in accordance with a predetermined interpretation method; and
    controlling an operation of an apparatus and input states of information or a signal.

8. A spatial position detection apparatus for implementing the spatial position detection method according to claim 1, at least comprising:
    at least one electromagnetic wave detection section for detecting an electromagnetic wave radiated from the object and transmitted though the interface section; and
    a position calculation section for calculating information on spatial position coordinates of the object based on a result of the detecting,
    wherein the interface section has characteristics of transmitting the electromagnetic wave radiated from the object, and at least the electromagnetic wave detection section and the position calculation section are provided in a space on the opposite side of the object with the interface section regarded as a boundary or enclosed inside the interface section.

9. An information input apparatus, comprising:
    the spatial position detection apparatus according to claim 8; and
    an information input/output control section that is provided in a space on the opposite side of the object with the interface section regarded as a boundary or enclose inside the interface section, monitors information on a relative distance between an arbitrary position of the interface section and the object, processes a result of the monitoring in accordance with a predetermined interpretation method, and controls an operation of the apparatus and input states of information or a signal.

10. A spatial position information detection apparatus for detecting information on a relative spatial position of an object with respect to an interface section having an arbitrary shape and dealing with transmission of information and a signal from one side to the other side of the interface section, the apparatus comprising: a detection section for detecting an electromagnetic wave of a frequency bandwidth that is arbitrarily selected within a range from 30 GHz to 30 THz; a casing in which the detection section is contained; a memory section storing outer shape information of the casing; and a calculation section for calculating information on a relative position of an object with respect to the casing using the outer shape information and information obtained by detecting, with the detection section, an electromagnetic wave of the frequency bandwidth radiated from the object present outside the casing.

* * * * *

UNITED STATES PATENT AND TRADEMARK OFFICE
CERTIFICATE OF CORRECTION

PATENT NO. : 7,248,995 B2
APPLICATION NO. : 10/539268
DATED : July 24, 2007
INVENTOR(S) : Itsuji et al.

It is certified that error appears in the above-identified patent and that said Letters Patent is hereby corrected as shown below:

COVER SHEET:
Item (57) ABSTRACT, Line 6, "respective" should read -- respect --.

COLUMN 1:
Line 45, "camera." should read -- cameras. --.

COLUMN 3:
Line 16, "into a" should read -- into --; and
Line 26, "with in" should read -- within --.

COLUMN 4:
Line 25, "has been stayed" should read -- has stayed --.

COLUMN 5:
Line 8, "to attain." should read -- to be attained. --; and
Line 47, "into a" should read -- into --.

COLUMN 7:
Line 22, "Bv(T)" should read -- Bv(T) -- and
Line 23, "v is" should read -- v is --.

UNITED STATES PATENT AND TRADEMARK OFFICE
CERTIFICATE OF CORRECTION

PATENT NO. : 7,248,995 B2
APPLICATION NO. : 10/539268
DATED : July 24, 2007
INVENTOR(S) : Itsuji et al.

It is certified that error appears in the above-identified patent and that said Letters Patent is hereby corrected as shown below:

COLUMN 9:
Line 52, "An" should read -- A --.

COLUMN 12:
Line 67, "into a" should read -- into --.

COLUMN 18:
Line 40, "enclose" should read -- enclosed --.

Signed and Sealed this

Twenty-seventh Day of May, 2008

JON W. DUDAS
*Director of the United States Patent and Trademark Office*